US009712407B2

United States Patent
Singh et al.

(10) Patent No.: US 9,712,407 B2
(45) Date of Patent: Jul. 18, 2017

(54) HIERARCHICAL TEMPORAL CLUSTERING, METRIC CLUSTERING AND ATTRIBUTE CLUSTERING OF ELECTRONIC TERMINAL REPORTS TO IDENTIFY ELECTRONIC TERMINALS FOR ANALYSIS

(71) Applicant: CA, Inc., New York, NY (US)

(72) Inventors: Satnam Singh, Bangalore (IN);
VenkataBabji Sama, Bangalore (IN)

(73) Assignee: CA, Inc., Islandia, NY (US)

( * ) Notice: Subject to any disclaimer, the term of this patent is extended or adjusted under 35 U.S.C. 154(b) by 170 days.

(21) Appl. No.: 14/708,553

(22) Filed: May 11, 2015

(65) Prior Publication Data
US 2016/0337211 A1  Nov. 17, 2016

(51) Int. Cl.
G06F 15/173 (2006.01)
H04L 12/26 (2006.01)

(52) U.S. Cl.
CPC .......... H04L 43/065 (2013.01); H04L 43/067 (2013.01); H04L 43/0817 (2013.01)

(58) Field of Classification Search
CPC ... G06F 17/30427; H04L 67/02; H04L 67/16; H04L 67/2823; H04L 67/42; H04L 69/08
USPC .................................................. 709/224, 226
See application file for complete search history.

(56) References Cited

U.S. PATENT DOCUMENTS

| | | | | |
|---|---|---|---|---|
| 7,752,301 B1* | 7/2010 | Maiocco | ............... | G06F 15/173 709/224 |
| 8,914,366 B1* | 12/2014 | Li | ................ | G06F 17/3071 707/737 |
| 2013/0204948 A1* | 8/2013 | Zeyliger | ............. | G06F 9/44505 709/206 |
| 2014/0059228 A1* | 2/2014 | Parikh | .................. | G06F 9/5005 709/226 |

* cited by examiner

*Primary Examiner* — Phuoc Nguyen
(74) *Attorney, Agent, or Firm* — Sage Patent Group (57) ABSTRACT

A method of performing operations on a processor of an application analysis computer includes obtaining reports from electronic terminals. The reports contain metrics for operation of instances of an application processed by the electronic terminals and attributes of the electronic terminals characterizing their application processing platforms. Metrics clusters of the reports are generated based on the metrics. Attribute clusters of the reports are generated based on the attributes contained in the reports of one of the metrics clusters which satisfy a defined metric rule. One of the attribute clusters, which contains reports obtained from less than a threshold number of distinct electronic terminals, is identified. Identifiers of the electronic terminals are determined based on the attributes contained in the reports in the one of the attribute clusters. Information is communicated based on the identifiers of the electronic terminals.

23 Claims, 9 Drawing Sheets

Temporal and Metric Based Clustering of Content from Reports

| | Worrisome | Acceptable | Good |
|---|---|---|---|
| Morning | $V^M_{W1}$-$V^M_{Wn}$ | $V^M_{A1}$-$V^M_{An}$ | $V^M_{G1}$-$V^M_{Gn}$ |
| Afternoon | $V^A_{W1}$-$V^A_{Wn}$ | $V^A_{A1}$-$V^A_{An}$ | $V^A_{G1}$-$V^A_{Gn}$ |
| Evening | $V^E_{W1}$-$V^E_{Wn}$ | $V^E_{A1}$-$V^E_{An}$ | $V^E_{G1}$-$V^E_{Gn}$ |
| Night | $V^N_{W1}$-$V^N_{Wn}$ | $V^N_{A1}$-$V^N_{An}$ | $V^N_{G1}$-$V^N_{Gn}$ |

HIERARCHICAL TEMPORAL CLUSTERING, METRIC CLUSTERING AND ATTRIBUTE CLUSTERING OF ELECTRONIC TERMINAL REPORTS TO IDENTIFY ELECTRONIC TERMINALS FOR ANALYSIS

BACKGROUND

The present disclosure relates to computing systems, and, in particular, to management of electronic terminals, applications, and/or application servers.

Users install a myriad of different types of application programs (also commonly referred to as "applications" and "apps") on electronic terminals having widely varying software and hardware characteristics. For example, users can select from among several million different applications available on various application servers for downloading to cellular telephones (sometimes called "smart phones"), tablet computers, laptop computers, and other types of electronic terminals for processing. Over a billion Apple iOS electronic terminals and Android electronic terminals are presently being used throughout the world.

Moreover, the Internet has evolved to include a "physical Internet" including a myriad of types of electronic devices providing data processing, data sensing/generation, data communication, data storage, device control, user interface resources, etc. This evolution is sometimes referred to as "The Internet of Things", "Ubiquitous Computing", and "Pervasive Computing". It has been estimated that every person is surrounded by somewhere between 1000 and 5000 intelligent electronic devices and a global Internet of Things may soon include 50 to 100,000 billion electronic devices whose location and status users may desire to monitor or use.

Mobile analytics is an emerging technology that seeks to measure performance of applications processed by electronic terminals. Through mobile analytics processes, electronic terminals can collectively generate millions of performance reports every day for processing by an analysis computer. Analysis of the performance reports can require expensive and complex hardware and software resources and the analysis can be prone to excessive error or reduced usefulness due to the tremendous number of combinations of differing application characteristics and electronic terminal characteristics from which individual reports are generated.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments disclosed herein are directed to a method of performing operations on a processor of an application analysis computer. The method includes obtaining reports from electronic terminals. The reports contain metrics for operation of instances of an application processed by the electronic terminals and attributes of the electronic terminals characterizing their application processing platforms. Metrics clusters of the reports are generated based on the metrics. Attribute clusters of the reports are generated based on the attributes contained in the reports of one of the metrics clusters which satisfy a defined metric rule. One of the attribute clusters, which contains reports obtained from less than a threshold number of distinct electronic terminals, is identified. Identifiers of the electronic terminals are determined based on the attributes contained in the reports in the one of the attribute clusters. Information is communicated based on the identifiers of the electronic terminals.

Some other embodiments disclosed herein are directed to a computer program product that includes a computer readable storage medium having computer readable program code embodied therewith. The computer readable program code includes computer readable program code to obtain reports from electronic terminals. The reports contain metrics for operation of instances of an application processed by the electronic terminals and attributes of the electronic terminals characterizing their application processing platforms. The computer readable program code generates metrics clusters of the reports based on the metrics, and generates attribute clusters of the reports based on the attributes contained in the reports of one of the metrics clusters which satisfy a defined metric rule. The computer readable program code identifies one of the attribute clusters that contains reports obtained from less than a threshold number of distinct electronic terminals, determines identifiers of the electronic terminals based on the attributes contained in the reports in the one of the attribute clusters, and communicates information based on the identifiers of the electronic terminals.

Other methods, computer program products, and systems according to embodiments of the present disclosure will be or become apparent to one with skill in the art upon review of the following drawings and detailed description. It is intended that all such additional methods, computer program products, and systems be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to improved processes for analyzing performance metrics reported by electronic terminals. Although the reports can be received from a tremendous number of combinations of differing application characteristics and electronic terminal characteristics, various embodiments disclosed herein may operate to generate and organize the performance metrics from the reports in ways that facilitate use of less expensive and/or reduced complexity hardware and software resources. Utilization of processor resources, memory storage resources, and/or network communication resources may be reduced based on the operations for analyzing reports from electronic terminals which are disclosed herein for one or more of the embodiments.

Figure 1:
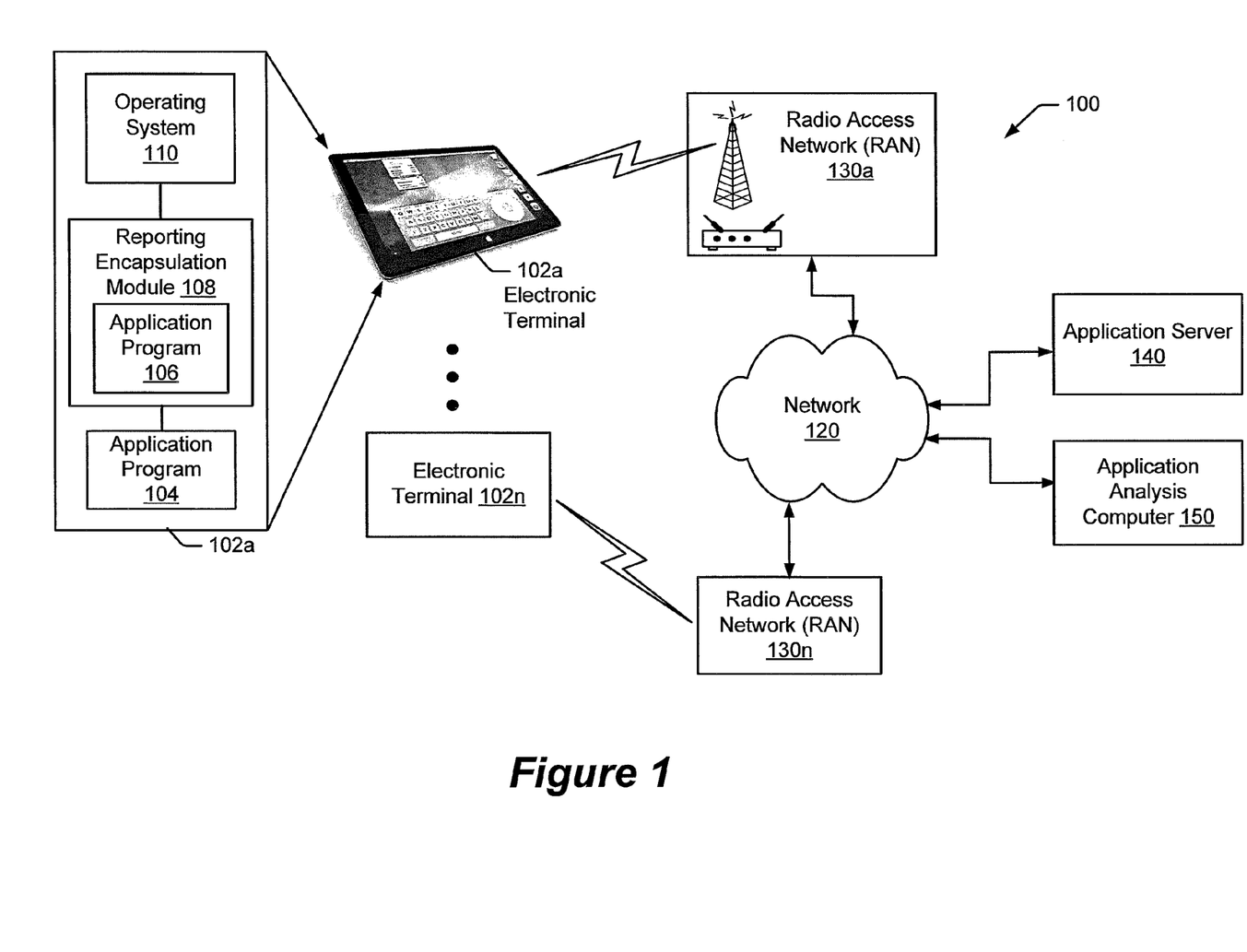
FIG. 1 is a block diagram of a system that analyzes operation of applications processed by electronic terminals based on temporal clustering, metric clustering, and attribute clustering of reports from the electronic terminals, in accordance with some embodiments of the present disclosure.

FIG. 1 is a block diagram of a system 100 that analyzes operation of applications processed by electronic terminals 102a-102n based on temporal clustering, metric clustering, and attribute clustering of reports from the electronic terminals 102a-102n, in accordance with some embodiments of the present disclosure. The reports contain metrics for operation of instances of an application processed by the electronic terminals 102a-102n and attributes of the electronic terminals 102a-102n characterizing their application processing platforms. The system 100 includes an application analysis computer 150 which receives reports from electronic terminals 102a-102n through wireless network communications (e.g., radio access networks (RAN) 130a-130n) and/or wired network communications to a data network 120. The data network 120 may be a private network and/or a public network such as the Internet. One or more of the electronic terminals 102a-102n may communicate through the radio access networks 130a-130n using one or more wireless communication protocols that may include, but are not limited to, 3GPP Long Term Evolution (LTE), WLAN (IEEE 802.11), WiMax, Bluetooth, etc.

The electronic terminals 102a-102n can download application programs from an application server 140. The application server 140 may, for example, include an Apple application store server (e.g., iTunes), an Android application store server (e.g., Google Play and/or Amazon Appstore), and/or a Window application store server (e.g., Microsoft Windows Store). Although the application analysis computer 150 has been illustrated as being separate from the application server 140, some or all of the functionality of the application analysis computer 150 disclosed herein may be combined with the application server 140 or another computer node ("network node") communicatively connected to the network 120.

The application programs may include gaming programs, spreadsheet programs, multimedia programs, word processing programs, database programs, presentation programs, etc. The application programs may be selected from among several million different applications available from application servers for downloading to many different types of electronic terminals. The electronic terminals 102a-102n may include cellular telephones (sometimes called "smart phones"), tablet computers, laptop computers, and other types of electronic communication devices configured for processing applications. Moreover, the electronic terminals 102a-102n may include other types of data processing, data sensing/generation, data communication, data storage, device control, user interface resources, etc, communicatively connected to the Internet, such as part of the Internet of Things.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein. Although the application analysis computer 150 may operate to analyze reports from any number of electronic terminals, efficiency improvements with utilization of processing, memory, and/or network communication resources may be particularly realized when processing reports obtained from many thousands or millions of electronic terminals.

Each of the electronic terminals 102a-102n (individually referred to as "electronic terminal 102") may include an instrument encapsulation module 108 that operates to generate reports containing performance metrics for an application program 106 ("application") processed by a processor of the electronic terminal 102. The instrument encapsulation module 108 may "wrap around" the application program 106 to intercept or otherwise observe application programming interface (API) calls from the application program 106 to other application programs 104 processed by the electronic terminal 102, an operating system 110 processed by the electronic terminal 102, and/or other software/hardware resources of the electronic terminal 102. The instrument encapsulation module 108 is not a necessary component of any electronic terminal since, for example, reports may be provided from another component of an electronic terminal that performs monitoring functionality.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

The instrument encapsulation module 108 or another component of the electronic terminal generates the reports which are communicated to the application analysis computer 150. Each report contain metrics for operation of the application 106 processed by the electronic terminal 102 and attributes of the electronic terminal 102 characterizing its application processing platform.

The types of metrics contained in a report may include, but are not limited to, any one or more of the following types:

1. application program utilization of electronic terminal processor resources;
2. application program utilization of electronic terminal memory resources;
3. application program utilization of electronic terminal network interface communication resources;
4. application program communication latency through the data network and/or the radio access network;
5. communication latency between the application program and another application program;
6. application program response latency to defined input;
7. application program wait time for receipt of user input;
8. rate of information displayed by the application program on a display device of the electronic terminal;
9. duration of operational use of the application program by the user;
10. time between instances of application program use;
11. time of day and/or day or week of instances of application program use;
12. velocity of the electronic terminal while processing the application program;
13. control gestures or other inputs provided by a user as input to control application program operation;
14. which features and/or sequences of features of the application program are used;
15. how often features and/or sequences of features of the application program 106 are used;
16. number of features or levels of features of the application program accessed or completed by a user;
17. events characterizing inefficient or ineffective operational use of the application program;
18. user selection of additional in-application features (e.g., download/activate);
19. user selection of other application programs (e.g., download/activate) while using the application program;
20. information characterizing data communications between the application program 106 and another application program, an operating system, and/or to other software/hardware resources of the electronic terminal;
21. events indicative of errors or undesirable operation of the application program; and
22. purchases made by users through the application program (e.g., in-app purchases).

The attributes contained in a report characterizing the application processing platform of the electronic terminal 102 may include, but are not limited to, any one or more of the following:

1. location geographic coordinates;
2. location city;
3. location state;
4. location country;
5. application identifier;
6. application version;
7. application functionality;
8. application display update rate capabilities;
9. application preferred or required memory capacity;
10. application preferred or required processor capacity;
11. application preferred or required network communication capacity;
12. application preferred or required co-executed other application(s);
13. electronic terminal identifier;
14. electronic terminal manufacturer;
15. electronic terminal model;
16. electronic terminal processor type;
17. electronic terminal memory capacity;
18. electronic terminal communication capability;
19. electronic terminal operating system type;
20. electronic terminal operating system version;
21. type of communication interface used and/or available for use by the application during processing (e.g., WIFI, cellular (e.g., cellular standard, local/roaming, etc.), Bluetooth, wired USB, wired Lightning, etc.);
22. electronic terminal display resolution;
23. electronic terminal camera resolution;
24. electronic terminal screen refresh rate capability;
25. electronic terminal speaker volume capability;
26. cellular wireless carrier registered for use by the electronic terminal;
27. user selected user-interface language;
28. user information;
29. operational settings selected by the user for operation of the application program 106 and/or changes over time in the user selected operational settings;
30. gaming challenges or levels of the application program selected by the user from among available challenges or levels;
31. other application programs active in background while the application is being process; and
32. occurrence of one or more defined control gestures performed by the user through a user interface of the electronic terminal to interface with the application program and/or frequency of occurrence of the one or more defined control gestures.

Figure 2:
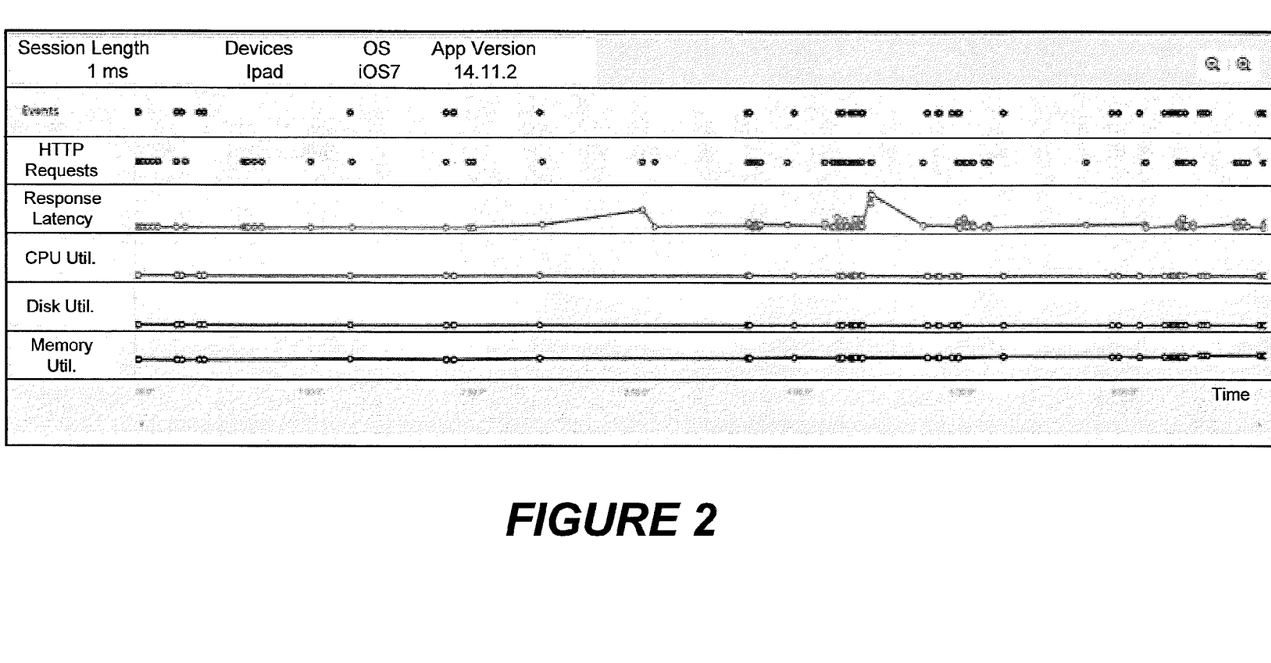
FIG. 2 illustrates a graphical display screen containing graphs of various metrics characterizing operation of instances of an application processed by electronic terminals which have the indicated platform attributes.

FIG. 2 illustrates a graphical display screen containing graphs of various metrics generated by the application analysis computer 150 based on content of reports received from the electronic terminals 102a-102n. The various metrics characterize operation of instances of an application processed by the electronic terminals 102a-102n which have the indicated application processing platform attributes. Referring to FIG. 2, the operational metrics include the number of HTTP requests made by the application 106, the HTTP response latency of the application 106, the processor (e.g., CPU) utilization by the application 106, the non-volatile mass memory (e.g., disk) utilization by the application 106, and memory (e.g., RAM) utilization by the application 106. The electronic terminals 102a-102n for which the statistical metrics are generated have the noted common attributes of being Apple iPad devices using version iOS7 of Apple's operating system and processing version 14.1 1.2 of the application 106. The user, such as an application developer or owner, can define the particular metrics, attributes, timeline, and other constraints on the input data, analysis operations, and/or the visual and/or textual format of the output information from the analysis.

Analysis of content of the reports from electronic terminals can be challenging because of the many different types of reported operational metrics, different attributes of electronic terminals from which reports are obtained, the potentially large number of electronic terminals generating reports, and/or the potentially high rate of report generation from various of the electronic terminals. For example, an application owner may desire to investigate a sudden rise observed in a particular metric, such as average response latency time, reported by a population of electronic terminals processing an application. An application owner may desire to isolate the problem based on characteristics of the operating system platform of the electronic terminals (e.g., having 3 different platforms of Android, iOS, and Windows), based on characteristics of the version of the operating system (e.g., having over 25 different versions of Android operating systems), based on the device manufacturer (e.g., having Samsung, Apple, and over 50 other manufacturers), and based on a country location from where the problematic reports were received (e.g., from USA, India, and over 200 other countries). The resulting analysis to be performed by an application analysis computer 150 may become exponentially more complex in view of the combinatorial problem arising from the numbers of combinations of the different types of attributes and values of the attributes (e.g., 3*25*50*200=750,000 combinations).

Various embodiments of the present disclosure are directed to forming hierarchical clusters of content of the reports to, for example, reduce the amount of processor resources, memory (e.g., RAM and/or disk) storage resources, and/or network communication resources which are used by the application analysis computer 150 to process the reports and to generate analysis that can be more intuitively understood by a human operator and/or which can be efficiently used to control the electronic terminals 102a-102n and/or the application server 140.

Figure 3:
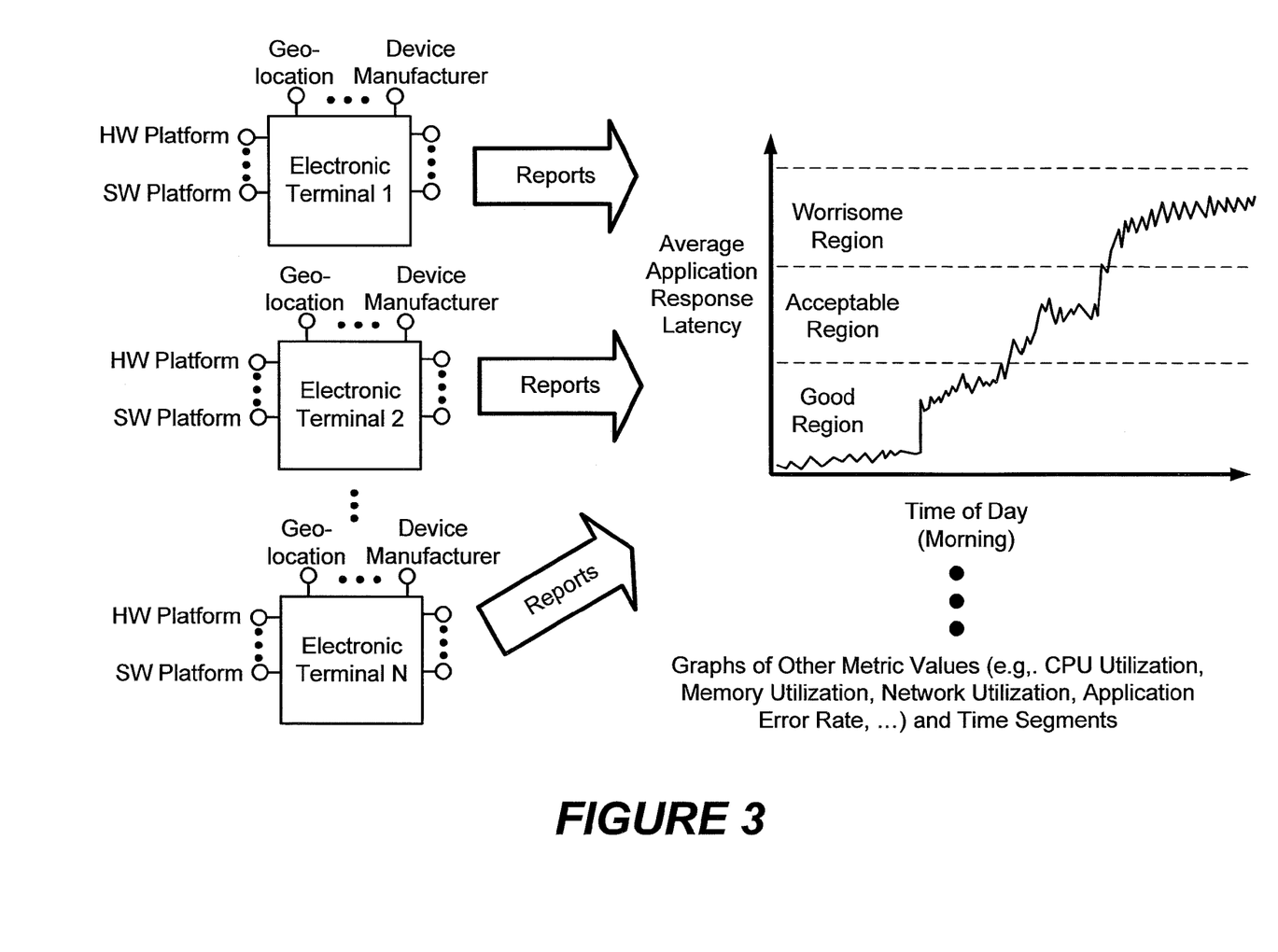
FIG. 3 illustrates data flows and associated operations which may be performed to generate metrics clusters of the reports based on metrics, in accordance with some embodiments of the present disclosure.
Figure 4:
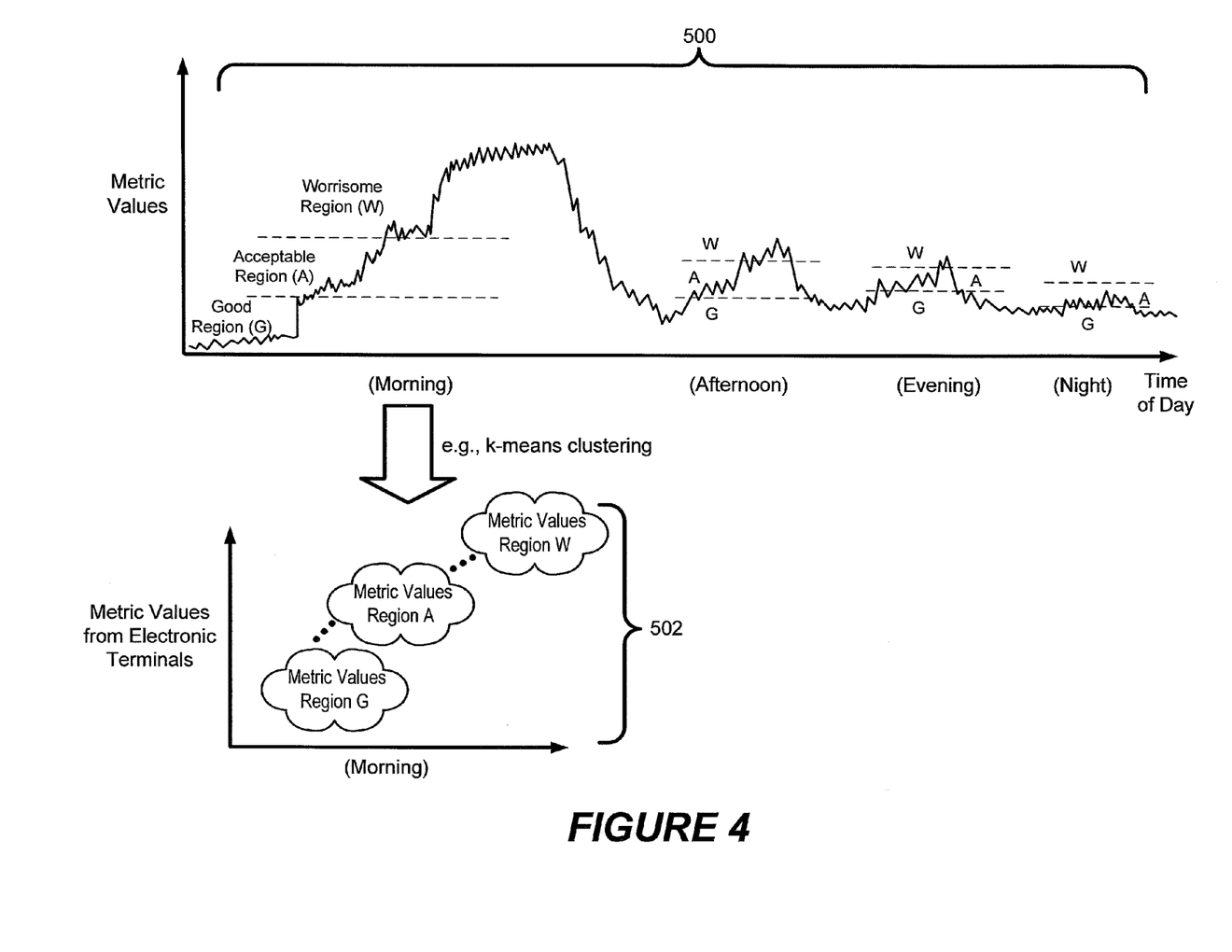
FIG. 4 illustrates data flows and associated operations which may be performed to generate temporal clusters and then metrics clusters of the reports, in accordance with some embodiments of the present disclosure.
Figure 5:
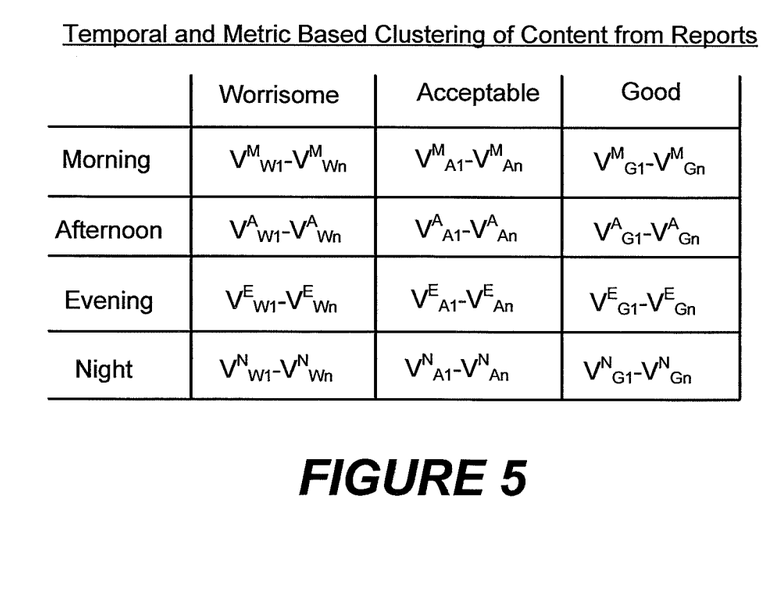
FIG. 5 illustrates logical data structures in the form of a table that may be generated from temporal and metric based clustering of content from the reports, in accordance with some embodiments of the present disclosure.
Figure 6:
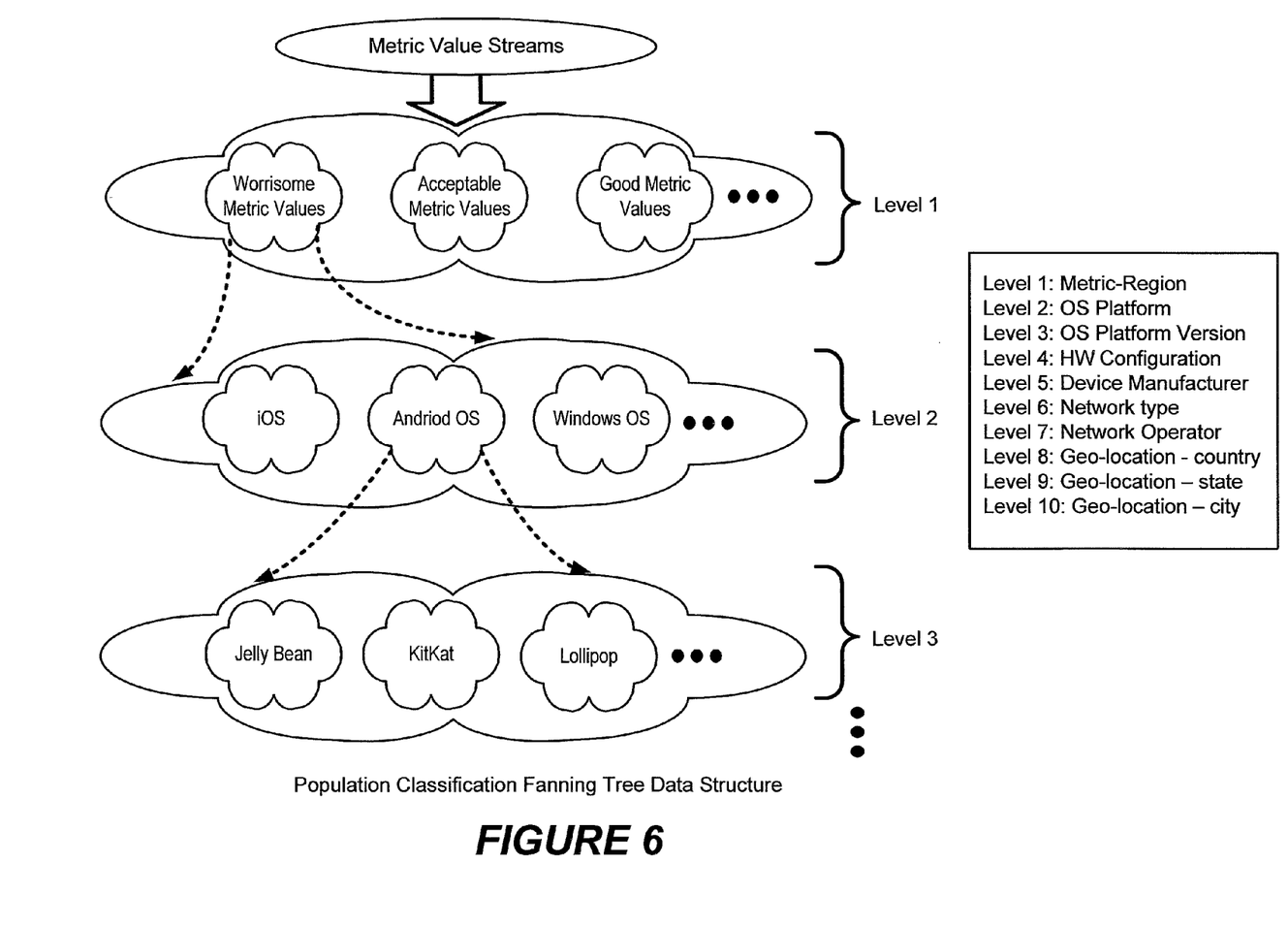
FIG. 6 illustrates data flows and associated operations which may be performed to generate a population classification fanning tree data structure of hierarchical levels of sub-clusters of the reports depending from each of the attribute clusters, in accordance with some embodiments.
Figure 7:
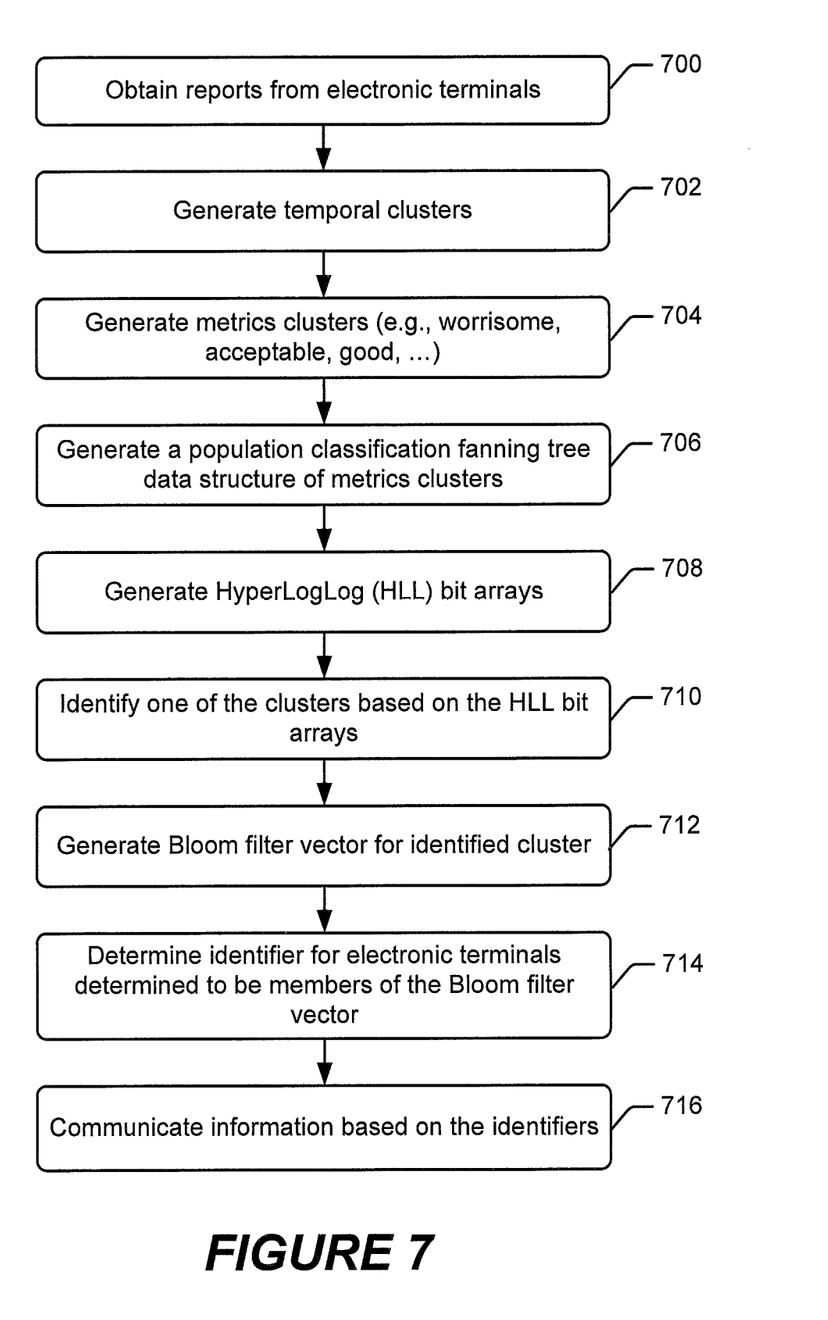
FIGS. 7 and 8 are flowcharts of operations by an application analysis computer to perform temporal clustering, metric clustering, and attribute clustering of reports from the electronic terminals, in accordance with some embodiments of the present disclosure.

FIGS. 3-4 and 6 illustrates data flows and associated operations which may be performed to generate metrics clusters of the reports based on metrics contained in the reports, to generate temporal clusters and then metrics clusters of the reports, and to generate a population classification fanning tree data structure of hierarchical levels of sub-clusters of the reports depending from each of the attribute clusters, in accordance with some embodiments. FIG. 5 illustrates logical data structures in the form of a table that may be generated from temporal and metric based clustering of content from the reports, in accordance with some embodiments of the present disclosure. FIG. 7 is a flowchart of operations by the application analysis computer 150 to perform temporal clustering, metric clustering, and attribute clustering of reports from the electronic terminals, in accordance with some embodiments of the present disclosure.

Referring to FIGS. 3, 4 and 7, the application analysis computer 150 obtains (block 700) reports from the electronic terminals 102a-102n. As illustrated in FIG. 3, the reports contain metrics for operation of instances of an application processed by the electronic terminals and attributes of the electronic terminals characterizing their application processing platforms (e.g., hardware (HW) platform, software (SW) platform, geolocation, device manufacturer, etc.).

The application analysis computer 150 generates (block 702) temporal clusters of the reports based on determined time boundaries. More particularly, the computer 150 may determine times when reports were individually obtained from the electronic terminals 102a-102n. The computer 150 defines time boundaries for temporal clusters of the reports so that the time boundaries satisfy a defined multinomial Gaussian distribution fitting algorithm constraining numbers of the reports between pairs of the time boundaries. Alternatively or additionally, the computer 150 defines time boundaries for temporal clusters of the reports so that the time boundaries satisfy a defined heuristic fitting algorithm constraining numbers of the reports between pairs of the time boundaries. The computer 150 generates the temporal clusters of the reports based on the time boundaries.

The computer 150 generates (block 704) metrics clusters of the reports based on the metrics. More particularly, when temporal clustering has been performed, the metrics clusters of the reports may be generated for one of the temporal clusters of the reports that as been selected based on, for example, analysis of metrics within that temporal cluster relative to a defined metric rule (e.g., a rule defining acceptable processor utilization, memory utilization, application response latency, etc.).

In the example of FIG. 4, metric values (e.g., for a selected one of the available metrics) contained in an aggregated stream of reports 500 from the electronic terminals 102a-102n have been graphed along the vertical-axis and relative to time of day along the horizontal-axis. Temporal clusters of the reports have been generated based on boundaries determined for time intervals which have been illustrated as "morning", "afternoon", "using", "night", although other time interval boundaries may be determined based on use of multinomial Gaussian distribution fitting algorithm(s), heuristic fitting algorithm(s), and/or another algorithm. Reports in each of the temporal clusters have been further clustered to form metrics clusters, which have been illustrated as "worrisome region", "acceptable region", "good region", etc. FIG. 3 shows an expanded portion of the average application response latency metric determined from content of the reports within the "morning" temporal cluster. The average application response latency metric has been compared to a defined metric rule for values that are to be classified according to the defined metric cluster (i.e., worrisome, acceptable, good, etc.) to generate (block 704) the metric clusters of the reports.

The graph of FIG. 3 may alternatively indicate another one of the available metrics, such as processor utilization, memory utilization, network utilization, application error rate, or metric. Moreover, the metrics clusters may be determined based on comparing values generated from combinations of two or more types of metrics to defined rules.

FIG. 5 is a table which illustrates logical data structures that may be generated from temporal and metric based clustering of content from the reports. In the example of FIG. 5, temporal clusters of the reports have been formed based on time boundaries corresponding to morning, afternoon, evening, and night. Metric clusters have been formed according to boundary conditions defined for what constitutes worrisome, acceptable, and good metric values.

To generate the metric clusters, the application analysis computer 150 may iteratively partitioning the reports into the metrics clusters based on seeking to reduce differences in each of the metrics clusters between values of the metrics contained in the reports within the metrics cluster and median values of the metrics contained in the reports within the metrics cluster. More particularly, the iterative partitioning of the reports into the metrics clusters may be performed based on processing metrics contained in the reports through a K-means clustering algorithm. Alternative, the iterative partitioning may be performed based on K-centroid or K-median algorithms. FIG. 4 illustrates how K-means clustering has been further used to cluster the metric values of the reports into good (G), acceptable (A), and worrisome (W) regions 502.

The application analysis computer 150 can then generate attribute clusters of the reports based on the attributes contained in the reports of one of the metrics clusters which satisfy a defined metric rule. Generation of the attribute cluster may include generating a population classification fanning tree data structure of hierarchical levels of sub-clusters of the reports depending from each of the attribute clusters. FIG. 6 illustrates data flows and associated operations which may be performed to generate a population classification fanning tree data structure of hierarchical levels of sub-clusters of the reports depending from each of the attribute clusters, in accordance with some embodiments. Different ones of the hierarchical levels of the sub-clusters contain reports clustered based on different ones of the attributes, and different sub-clusters within a same one of the hierarchical levels contain different values of the defined attribute. Some different ones of the hierarchical levels of the sub-clusters contain reports clustered based on different types of the attributes that include: software configuration information for the electronic terminals; hardware configuration information for the electronic terminals; and location of the electronic terminals.

In the example of FIG. 6, metric values contained in reports within the worrisome cluster (root level 1) have been selected for the generation of a population classification fanning tree data structure therefrom. Content of the reports is further sub-clustered in a next-lower hierarchical level (level 2) based on operating system attributes (e.g., iOS, Android OS, Windows OS, etc.) of the electronic terminals 102a-102n. Content of the reports is further sub-clustered in a next-lower hierarchical level (level 3) based on operating system version attributes (e.g., Jellybean, KitKat, Lollipop, etc.) of the electronic terminals 102a-102n. Content of the reports can be further sub clustered in further hierarchical levels, e.g., levels 4 . . . . According to other attributes (e.g., hardware configuration, device manufacturer, network type, network operator, geolocation, etc.) of the electronic terminals 102a-102n.

The application analysis computer 150 identifies one of the attribute clusters that contains reports obtained from less than a threshold number of distinct electronic terminals 102a-102n. That identified attribute cluster may be identified based on containing metric values have been determined to be worrisome, and have electronic terminal attributes of an Android operating system of version Jelly Bean. Thus, for example, a cluster of reports that have been obtained a threshold number of electronic terminals having the same defined set of attribute values can be identified for further analysis.

Identification of the attribute cluster may include generating (block 708), for each of the attribute clusters, a hyperloglog (HLL) bit array based on the attributes which are contained in the reports of the attribute cluster. One of the attribute clusters that contains reports obtained from less than a threshold number of distinct electronic terminals may then be identified (block 710) based on the HLL bit arrays. In one embodiment, a level of intersection is determined between the HLL bit arrays, and one of the attribute clusters, which contains reports obtained from less than the threshold number of distinct electronic terminals, is determined based on at least a threshold level of intersection being determined between the HLL bit array of the one of the attribute clusters and the HLL bit array of at least one other one of the attribute clusters.

According to some example operations, every report includes an identifier for the electronic terminal which originated the report. The identifier is unique to the electronic terminal. The report therefore contains the electronic terminal identifier and a metric value(s). A HLL bit array is generated for each metric cluster (e.g., worrisome, acceptable, and good). For a specific electronic terminal to obtain membership in one or more of the metric clusters, the computer 150 monitors intersection of the clusters of the fanning tree data structure. Each HLL bit array represents a set of electronic terminals whose metric value falls within conditions of the associated cluster at least once. When the HLL bit arrays reach a defined level of stability (e.g., Cardinality of the metric clusters changes less than a threshold amount), the computer 150 initiates testing of membership of electronic terminal identifiers which have been obtained in reports or which are thereafter obtained in further reports from the electronic terminals (i.e., in-line real-time testing) against the stable HLL bit arrays. The computer 150 classifies the further reports into one of the metric clusters (e.g., worrisome, acceptable, good). These operations result in clustering of reports from devices that behave consistently (e.g., exhibit worrisome operational behavior).

The computer 150 then determines identifiers of the electronic terminals based on the attributes contained in the reports in the one of the attribute clusters. Determination of the electronic terminal identifiers can include generating (block 712) a Bloom filter vector based on content of the records in the one of the attribute clusters. The Bloom filter vector is a probabilistic data structure that needs a minimum of space and never provides false negatives as to what designated term (e.g., electronic terminal identifier) is contained within records of a partition. Generation of the Bloom filter can be initiated based on the determination of at least the threshold level of intersection between the hyperloglog bit array of the one of the attribute clusters and the hyperloglog bit array of the at least one other one of the attribute clusters. Membership of content of further reports obtained from electronic terminals is tested against the Bloom filter vector. The identifier of a electronic terminal from which one of the further reports is obtained, is determined (block 714) based on determining that one of the further reports contains content that is a member of the Bloom filter vector.

Thus, in one embodiment, once the application analysis computer 150 has determined that electronic terminals having certain determined characteristics have operational metrics that satisfy a defined metric rule, such as by having excessive application response latency and excessive processor utilization, the computer 150 then uses the generated Bloom filter to test incoming newly received reports from electronic terminals to identify which of those electronic terminals are among those that generated reports within the cluster that was determined to have metrics satisfying the defined metric rule. Those identified electronic terminals can then be tracked as they generate further reports and analyzed using more of the available metrics to, for example, identify a root cause of problematic operation.

The computer 150 then communicates information based on the identifiers of the electronic terminals, and may furthermore communicate analysis data generated from the metrics and attributes. The computer 150 may communicate the information to a network node, such as the application server 140, a computer operated by an application owner, a computer operated by the application developer, etc. The network node can control downloading of the application from the application server 150 to electronic terminals based on the information. The application server 150 may disable further download of the application to particular ones of the electronic terminals 102a-102n that are identified based on information, and/or by generating a message to the particular ones of the electronic terminals 102a-102n offering an alternative version of the particular application program and/or a substitute application program for replacing the particular application program.

Alternatively or additionally, the computer 150 may communicate the information to the electronic terminals having the identifiers to control processing of the application based on the information. For example, the computer 150 may communicate a command message(s) that is addressed to the identified ones of the electronic terminals 102a-102n and contains information that identifies the particular application and may further identify a problematic operation associated with the particular application and/or a notification that is to be displayed to users. The instrument encapsulation module 108 or another element of the electronic terminals may responsively adapt operation of the application program 106 based on the command, such as to disable operation of the application program 106, disable operation of a particular feature of the application program 106, and/or display a message on a display device of the selected electronic terminals 102 to warn users of problematic operation of the identified application.

Figure 8:
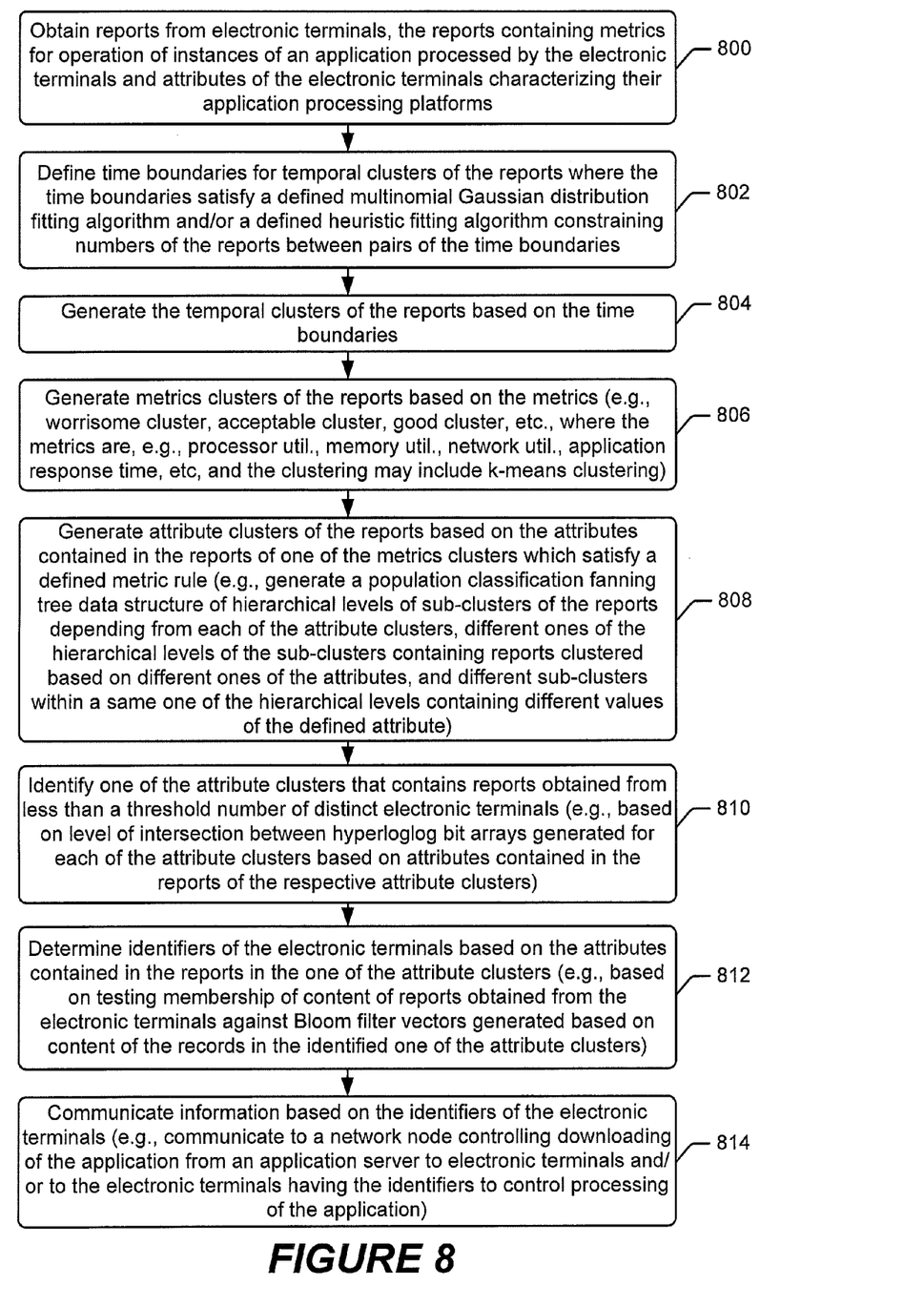

FIG. 8 is a flowchart that illustrates further more detailed operations that may be performed by the application analysis computer 150 to perform temporal clustering, metric clustering, and attribute clustering of reports from the electronic terminals 102a-102n, in accordance with some embodiments of the present disclosure.

Referring to FIG. 8, the application analysis computer 150 obtained (block 800) reports from electronic terminals. The reports contain metrics for operation of instances of an application process by the electronic terminals and attributes of the electronic terminals characterizing their application processing platforms. Time boundaries are defined (block 802) for temporal clusters of reports, where the time boundaries satisfy a defined multinomial Gaussian distribution fitting algorithm and/or a defined heuristic fitting algorithm constraining numbers of the reports between pairs of the time boundaries.

Temporal clusters of the reports are generated (block 804) based on the time boundaries. Metrics clusters of the reports are generated (block 806) based on the metrics. As explained above, the metrics clusters may be generated using a K-means clustering algorithm, a K-centroid clustering algorithm, and/or a K-median clustering algorithm. Attribute clusters of the reports are generated (block 808) based on attributes contained in reports of one of the metrics clusters which satisfy a defined metric rule. The attribute clusters may be generated as a population classification fanning tree data structure of hierarchical levels of sub-clusters of the reports depending from each attribute clusters. Different ones of the hierarchical levels of the sub-clusters contain reports cluster based on different ones of the attributes. Different sub-clusters within the same one of the hierarchical levels contains different values of the same defined attribute.

One of attribute clusters that contains reports obtained from less than a threshold number of distinct electronic terminals is identified (block 810). The identification a be performed based on determining a level of intersection between Hyperloglog bit arrays generated for each of attribute clusters based on attributes contained in the reports of the respective attribute clusters. Identifiers of the electronic terminals are determined (block 812) based on attributes contained in the reports in the one of the attribute clusters. Identifiers may be determined based on testing membership of content of reports obtained from electronic terminals against Bloom filter vectors which are generated based on content of the records and identified one of attribute clusters. Information is communicated (block 814) based on identifiers of electronic terminals.

Example Application Analysis Computer

Figure 9:
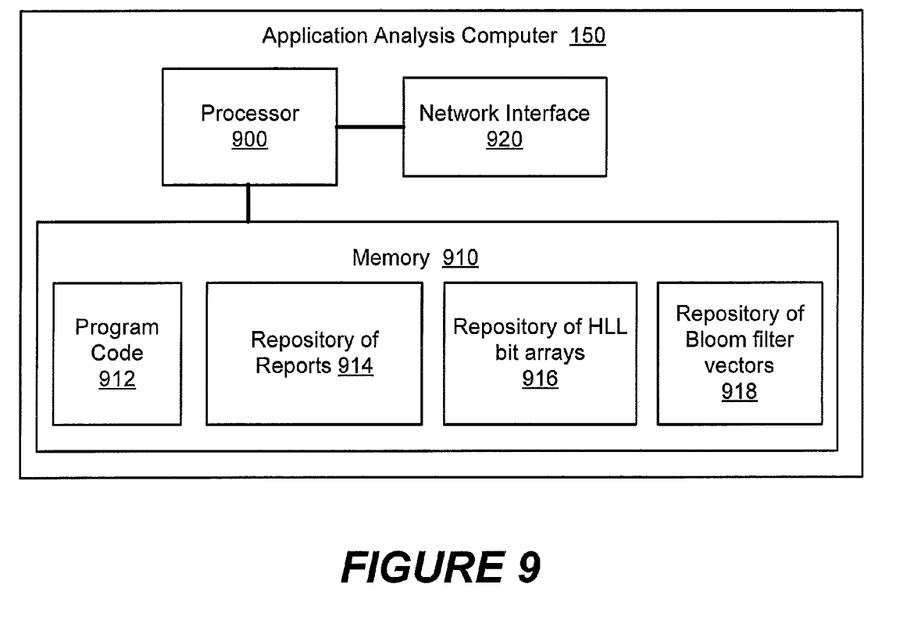
FIG. 9 is a block diagram of an application analysis computer configured according to some embodiments of the present disclosure.

FIG. 9 is a block diagram of an application analysis computer 150 configured according to some embodiments of the present disclosure. The application analysis computer 150 includes a processor 900, a memory 910, and a network interface 920 which may include a radio access transceiver and/or a wired network interface (e.g., Ethernet interface). The processor 900 may include one or more data processing circuits, such as a general purpose and/or special purpose processor (e.g., microprocessor and/or digital signal processor) that may be collocated or distributed across one or more networks. The processor 900 is configured to execute computer program code 912 in the memory 910, described below as a non-transitory computer readable medium, to perform at least some of the operations described herein as being performed by an application analysis computer. The memory 910 or another memory (e.g., nonvolatile mass storage) a store a repository 914 of the reports obtained from electronic terminals, a repository of Hyperloglog bit arrays 916, and/or a repository of Bloom filter vectors 918 according to one or more embodiments disclosed herein for the application analysis computer 150. The application analysis computer 150 may further include a user input interface (e.g., touch screen, keyboard, keypad, etc.) and a display device.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of an application analysis computer:
receiving reports from electronic terminals through a network interface, the reports containing metrics for operation of instances of an application processed by the electronic terminals and attributes of the electronic terminals characterizing their application processing platforms;
generating metrics clusters of the reports based on the metrics;

generating attribute clusters of the reports based on the attributes contained in the reports of one of the metrics clusters which satisfy a defined metric rule;

generating a Bloom filter vector based on content of the records in the attribute clusters;

testing membership of content of further reports obtained from electronic terminals against the Bloom filter vector;

testing for problematic operation of an electronic terminal from which one of the further reports is obtained responsive to determining that the one of the further reports contains content that is a member of the Bloom filter vector, the testing for problematic operation of the electronic terminal comprising comparing content of the one of the further reports to content of the records in the one of the metric clusters;

determining an identifier of the electronic terminal responsive to identifying problematic operation of the electronic terminal; and communicating information through the network interface to an application server which controls the application server to disable further download of the application to the electronic terminal.

2. The method of claim 1, before the generating metrics clusters of the reports based on the metrics, further comprising:

determining times when reports were obtained from the electronic terminals;

defining time boundaries for temporal clusters of the reports where the time boundaries satisfy a defined multinomial Gaussian distribution fitting algorithm constraining numbers of the reports between pairs of the time boundaries; and generating the temporal clusters of the reports based on the time boundaries, wherein the metrics clusters of the reports are generated for one of the temporal clusters of the reports.

3. The method of claim 1, before the generating metrics clusters of the reports based on the metrics, further comprising:

determining times when reports were obtained from the electronic terminals;

defining time boundaries for temporal clusters of the reports where the time boundaries satisfy a defined heuristic fitting algorithm constraining numbers of the reports between pairs of the time boundaries; and generating the temporal clusters of the reports based on the time boundaries, wherein the metrics clusters of the reports are generated for one of the temporal clusters of the reports.

4. The method of claim 1, wherein the generating metrics clusters of the reports based on the metrics, comprises:

partitioning the reports into some of the metrics clusters based on types of the metrics that comprise: processor utilization; memory utilization; network communication utilization; application response time; and application error rates.

5. The method of claim 1, wherein the generating metrics clusters of the reports based on the metrics, comprises:

iteratively partitioning the reports into the metrics clusters based on seeking to reduce differences in each of the metrics clusters between values of the metrics contained in the reports within the metrics cluster and median values of the metrics contained in the reports within the metrics cluster.

6. The method of claim 5, wherein the iteratively partitioning the reports into the metrics clusters based on seeking to reduce differences in each of the metrics clusters between the metrics contained in the reports within the metrics cluster and median values of the metrics contained in the reports within the metrics cluster, comprises:

processing metrics contained in the reports through a K-means clustering algorithm.

7. The method of claim 1, wherein the generating attribute clusters of the reports based on the attributes contained in the reports of one of the metrics clusters which satisfy the defined metric rule, comprises:

generating a population classification fanning tree data structure of hierarchical levels of sub-clusters of the reports depending from each of the attribute clusters, different ones of the hierarchical levels of the sub-clusters containing reports clustered based on different ones of the attributes, and different sub-clusters within a same one of the hierarchical levels containing different values of the defined attribute.

8. The method of claim 7, wherein:

some different ones of the hierarchical levels of the sub-clusters contain reports clustered based on different types of the attributes that comprise: software configuration information for the electronic terminals; hardware configuration information for the electronic terminals; and location of the electronic terminals.

9. The method of claim 1, further comprising:

identifying one of the attribute clusters that contains reports obtained from less than a threshold number of distinct electronic terminals, by operations comprising:

for each of the attribute clusters, generating a hyperloglog bit array based on the attributes which are contained in the reports of the attribute cluster;

determining level of intersection between the hyperloglog bit arrays; and identifying the one of the attribute clusters, which contains reports obtained from less than the threshold number of distinct electronic terminals, based on at least a threshold level of intersection being determined between the hyperloglog bit array of the one of the attribute clusters and the hyperloglog bit array of at least one other one of the attribute clusters; and precluding the testing for problematic operation of the electronic terminal from which a further report is obtained if content of the further report has attributes corresponding the one of the attribute clusters that is identified.

10. The method of claim 9, further comprising generating the Bloom filter vector based on content of the records in the one of the attribute clusters, wherein the generating the Bloom filter is initiated based on the determination of at least the threshold level of intersection between the hyperloglog bit array of the one of the attribute clusters and the hyperloglog bit array of the at least one other one of the attribute clusters;

testing membership of content of further reports obtained from electronic terminals against the Bloom filter vector; and determining the identifier of the electronic terminal from which the one of the further reports is obtained, based on determining that the one of the further reports contains content that is a member of the Bloom filter vector.

11. The method of claim 1, further comprising:

communicating a message through the network interface and addressed to the identifier of the electronic terminal, the message identifying at least one of an alternative version of the application and a substitute application that the electronic terminal can download from the application server to replace the application in local memory of the electronic terminal.

12. The method of claim 1, further comprising:
communicating a message through the network interface and addressed to the identifier of the electronic terminal that controls processing of the application by the electronic terminal.

13. The method of claim 12, wherein the message is configured to control the electronic terminal to disable further operation of the application.

14. The method of claim 12, wherein the message is configured to control the electronic terminal to disable further operation of a particular feature of the application.

15. A computer program product comprising:
a computer readable storage medium having computer readable program code embodied therewith, the computer readable program code comprising:
computer readable program code to receive reports from electronic terminals through a network interface, the reports containing metrics for operation of instances of an application processed by the electronic terminals and attributes of the electronic terminals characterizing their application processing platforms;
computer readable program code to generate metrics clusters of the reports based on the metrics;
computer readable program code to generate attribute clusters of the reports based on the attributes contained in the reports of one of the metrics clusters which satisfy a defined metric rule;
computer readable program code to generate a Bloom filter vector based on content of the records in the attribute clusters;
computer readable program code to test membership of content of further reports obtained from electronic terminals against the Bloom filter vector;
computer readable program code to test for problematic operation of an electronic terminal from which one of the further reports is obtained responsive to determining that the one of the further reports contains content that is a member of the Bloom filter vector, the testing for problematic operation of the electronic terminal comprising comparing content of the one of the further reports to content of the records in the one of the metric clusters;
computer readable program code to determine an identifier of the electronic terminal responsive to identifying problematic operation of the electronic terminal; and
computer readable program code to communicate information through the network interface to an application server which controls the application server to disable further download of the application to the electronic terminal.

16. The computer program product of claim 15, wherein the generating metrics clusters of the reports based on the metrics, comprises:
iteratively partitioning the reports into the metrics clusters based on seeking to reduce differences in each of the metrics clusters between values of the metrics contained in the reports within the metrics cluster and median values of the metrics contained in the reports within the metrics cluster.

17. The computer program product of claim 15, wherein the generating attribute clusters of the reports based on the attributes contained in the reports of one of the metrics clusters which satisfy the defined metric rule, comprises:
generating a population classification fanning tree data structure of hierarchical levels of sub-clusters of the reports depending from each of the attribute clusters, different ones of the hierarchical levels of the sub-clusters containing reports clustered based on different ones of the attributes, and different sub-clusters within a same one of the hierarchical levels containing different values of the defined attribute.

18. The computer program product of claim 15, further comprising:
computer readable program code to identify one of the attribute clusters that contains reports obtained from less than a threshold number of distinct electronic terminals, by operations comprising:
for each of the attribute clusters, generating a hyperloglog bit array based on the attributes which are contained in the reports of the attribute cluster;
determining level of intersection between the hyperloglog bit arrays; and
identifying the one of the attribute clusters, which contains reports obtained from less than the threshold number of distinct electronic terminals, based on at least a threshold level of intersection being determined between the hyperloglog bit array of the one of the attribute clusters and the hyperloglog bit array of at least one other one of the attribute clusters; and
computer readable program code to preclude the testing for problematic operation of the electronic terminal from which a further report is obtained if content of the further report has attributes corresponding the one of the attribute clusters that is identified.

19. The computer program product of claim 18, further comprising:
computer readable program code to generate the Bloom filter vector based on content of the records in the one of the attribute clusters, wherein the generating the Bloom filter is initiated based on the determination of at least the threshold level of intersection between the hyperloglog bit array of the one of the attribute clusters and the hyperloglog bit array of the at least one other one of the attribute clusters;
computer readable program code to test membership of content of further reports obtained from electronic terminals against the Bloom filter vector; and
computer readable program code to determine the identifier of the electronic terminal from which the one of the further reports is obtained, based on determining that the one of the further reports contains content that is a member of the Bloom filter vector.

20. The computer program product of claim 15, further comprising:
computer readable program code to communicate a message through the network interface and addressed to the identifier of the electronic terminal, the message identifying at least one of an alternative version of the application and a substitute application that the electronic terminal can download from the application server to replace the application in local memory of the electronic terminal.

21. The computer program product of claim 15, further comprising:
computer readable program code to communicate a message through the network interface and addressed to the identifier of the electronic terminal that controls processing of the application by the electronic terminal.

22. The computer program product of claim 21, wherein the message is configured to control the electronic terminal to disable further operation of the application.

23. The computer program product of claim 21, wherein the message is configured to control the electronic terminal to disable further operation of a particular feature of the application.

\* \* \* \* \*